(12) United States Patent
Yao

(10) Patent No.: US 12,217,388 B2
(45) Date of Patent: Feb. 4, 2025

(54) IMAGE PROCESSING METHOD AND DEVICE, ELECTRONIC EQUIPMENT, AND STORAGE MEDIUM

(71) Applicant: REALME CHONGQING MOBILE TELECOMMUNICATIONS CORP., LTD., Yufengshan (CN)

(72) Inventor: Kun Yao, Yufengshan (CN)

(73) Assignee: REALME CHONGQING MOBILE TELECOMMUNICATIONS CORP, LTD., Yufengshan (CN)

( * ) Notice: Subject to any disclaimer, the term of this patent is extended or adjusted under 35 U.S.C. 154(b) by 447 days.

(21) Appl. No.: 17/739,963

(22) Filed: May 9, 2022

(65) Prior Publication Data

US 2022/0261961 A1  Aug. 18, 2022

Related U.S. Application Data

(63) Continuation of application No. PCT/CN2020/131892, filed on Nov. 26, 2020.

(30) Foreign Application Priority Data

Nov. 28, 2019 (CN) .......................... 201911194628.9

(51) Int. Cl.
*G06K 9/00* (2022.01)
*G06T 3/4053* (2024.01)
*G06T 5/50* (2006.01)

(52) U.S. Cl.
CPC .............. *G06T 3/4053* (2013.01); *G06T 5/50* (2013.01); *G06T 2207/20221* (2013.01)

(58) Field of Classification Search
CPC ......... G06T 2207/20221; G06T 3/4053; G06T 5/50; H04N 23/667; H04N 23/951
See application file for complete search history.

(56) References Cited

U.S. PATENT DOCUMENTS 11,449,989 B2 * 9/2022 Tian ...................... G06T 7/0012
2011/0211765 A1 * 9/2011 Nagumo ............... G06T 3/4053
382/254

(Continued)

FOREIGN PATENT DOCUMENTS

CN 104966269 A 10/2015
CN 108259997 A 7/2018

(Continued)

OTHER PUBLICATIONS

The supplementary European search report dated Dec. 23, 2022 from European patent Application No. 20891548.8.

(Continued)

*Primary Examiner* — Avinash Yentrapati
(74) *Attorney, Agent, or Firm* — Quarles & Brady LLP

(57) ABSTRACT

An image processing method and apparatus, an electronic device, and a storage medium, relating to the technical field of image processing. The method includes: acquiring a first image and a second image, wherein a resolution of the second image is greater than a resolution of the first image; determining difference information between a target pixel in the second image and a reference pixel corresponding to the target pixel point in the first image; and acquire a target image with the same resolution as the second image by applying an image differencing process to a predetermined image with the same resolution as the first image based on the difference information. This method can obtain the target image based on the difference value information, and improve image quality.

20 Claims, 7 Drawing Sheets

(56) References Cited

U.S. PATENT DOCUMENTS

2013/0308877 A1* 11/2013 Tezuka .................. G06T 3/4007
              382/300
2020/0060052 A1* 2/2020 Amano .............. H05K 13/0812

FOREIGN PATENT DOCUMENTS

| | | |
|---|---|---|
| CN | 108320263 A | 7/2018 |
| CN | 108805806 A | 11/2018 |
| CN | 108921782 A | 11/2018 |
| JP | 2011180798 A | 9/2011 |
| KR | 20120020008 A | 3/2012 |

OTHER PUBLICATIONS

The Notice of Allowance dated Feb. 6, 2023 from Chinese patent application No. 201911194628.9.
The First Office Action with search report Dated Jun. 13, 2022 from Chinese patent Application No. 201911194628.9.

* cited by examiner

IMAGE PROCESSING METHOD AND DEVICE, ELECTRONIC EQUIPMENT, AND STORAGE MEDIUM

This application is a continuation of International Application No. PCT/CN2020/131892, filed Nov. 26, 2020, which claims the priority of Chinese Patent application No. 201911194628.9, filed Nov. 28, 2019, and the contents of which are hereby incorporated by reference in their entirety.

BACKGROUND

The present disclosure relates to the field of image processing technology, and more particularly, to an image processing method, an image processing device, an electronic device, and a non-transitory computer-readable storage medium.

In processes of capturing images and videos through a terminal device disposed with multiple cameras, in order to improve shooting effects, high-pixel cameras are mostly used to capture high-resolution images.

In the related art, when high-resolution images are continuously acquired, an imaging effect and an image quality of images are poor. In addition, acquiring high-resolution images will lead to higher power consumption of a terminal equipment.

SUMMARY

Based on one aspect of the present disclosure, an image processing method is provided, comprising acquiring a first image and a second image, wherein a resolution of the second image is greater than a resolution of the first image; determining difference information between a target pixel in the second image and a reference pixel in the first image corresponding to the target pixel; and acquiring a target image with the same resolution as the second image by applying an image differencing process to a predetermined image with the same resolution as the first image based on the difference information.

Based on one aspect of the present disclosure, an electronic device is provided, comprising: an image sensor; a processor; and a memory, configured to store executable instructions of the processor; wherein the processor is configured to acquire a first image and a second image, wherein a resolution of the second image is greater than a resolution of the first image; determine difference information between a target pixel in the second image and a reference pixel in the first image corresponding to the target pixel; and acquire a target image with the same resolution as the second image by applying an image differencing process to a predetermined image with the same resolution as the first image based on the difference information.

Based on one aspect of the present disclosure, a non-transitory computer-readable storage medium is provided, having stored therein instructions that, when executed by a processor, cause the processor to: acquire a first image and a second image, wherein a resolution of the second image is greater than a resolution of the first image; determine difference information between a target pixel in the second image and a reference pixel in the first image corresponding to the target pixel; and acquire a target image with the same resolution as the second image by applying an image differencing process to a predetermined image with the same resolution as the first image based on the difference information.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The drawings herein are incorporated into the specification and constitute a part of the specification, show embodiments consistent with the disclosure, and are used together with the specification to explain the principle of the disclosure. Obviously, the drawings in the following description are only some embodiments of the present disclosure. For those of ordinary skill in the art, other drawings can be obtained based on these drawings without creative work.

DETAILED DESCRIPTION OF THE ILLUSTRATED EMBODIMENTS

Figure 1:
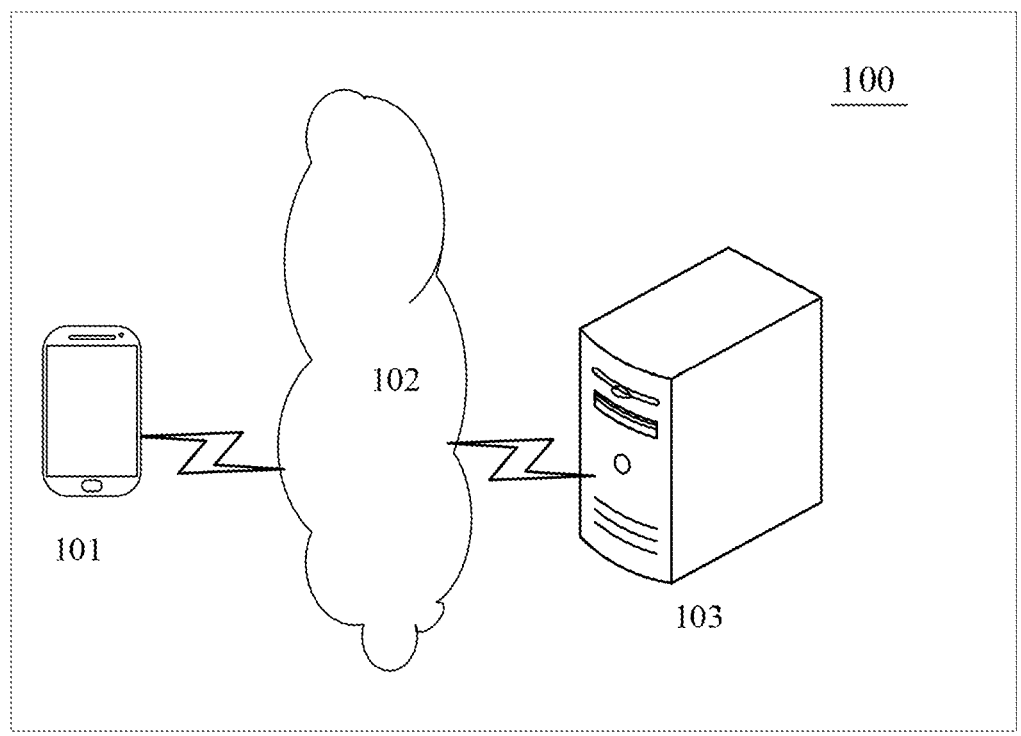
FIG. 1 shows a schematic diagram of a system architecture for implementing an image processing method in an embodiment of the present disclosure.

Example embodiments will now be described more fully with reference to the accompanying drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art. The described features, structures or characteristics can be combined in one or more embodiments in any suitable way. In the following description, many specific details are provided to give a sufficient understanding of the embodiments of the present disclosure. However, those skilled in the art will realize that the technical solutions of the present disclosure can be practiced without one or more of the specific details, or other methods, components, devices, steps, etc. can be used. In other cases, the well-known technical solutions are not shown or described in detail to avoid overwhelming the crowd and obscure all aspects of the present disclosure.

In addition, the drawings are only schematic illustrations of the present disclosure, and are not necessarily drawn to scale. The same reference numerals in the figures denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

FIG. 1 shows a system architecture diagram for implementing an image processing method. As shown in FIG. 1, the system architecture 100 may include a first terminal 101, a network 102, and a second terminal 103. Among them, the first terminal 101 may be a client terminal, for example, various handheld devices (smart phones), desktop computers, in-vehicle devices, wearable devices, etc. that have a camera function and are equipped with multiple cameras. The network 102 is used to provide a medium as a communication link between the first end 101 and the second end 103. The network 102 may include various connection types, such as wired communication links, wireless communication links, etc., in the embodiments of the present disclosure. Among them, the network 102 between the first terminal 101 and the second terminal 103 may be a wired communication link, for example, a communication link may be provided through a serial port cable, or may be a wireless communication link, and a communication link may be provided through a wireless network. The second end 103 may be a client terminal, such as a portable computer, a desktop computer, a smart phone, and other terminal devices that have a camera function and an image processing function, and are used to synthesize images or perform other image processing. Herein, when the first terminal and the second terminal are both client terminals, they may be the same client terminal.

The number of the first terminal, the network, and the second terminal in FIG. 1 are only illustrative. There can be any number of clients, networks, and servers based on implementation needs.

An image processing method provided by the embodiments of the present disclosure can be completely executed by the second terminal or the first terminal, or partly executed by the first terminal and partly executed by the second terminal, and the executive body does not make special restrictions. Correspondingly, an image processing device can be arranged in the second terminal 103 or in the first terminal 101.

In some embodiments of the present disclosure, cameras with different pixels in the client terminal can respectively capture a first image and a second image with different resolutions, and then calculate difference information between reference pixel points of the first image and target pixel points of the second image, thereby further processing a predetermined image into a high-resolution target image based on the difference information and the low-resolution predetermined image. Therefore, processes of outputting high-resolution images are avoided, and an image quality is improved.

In the image processing method, the image processing device, the electronic device, and the non-transitory computer-readable storage medium provided in the embodiments of the present disclosure, difference information between the target pixel in the second image and the reference pixel corresponding to the target pixel in the first image is used to perform difference processing on a predetermined image with the same resolution as the first image, so as to convert the predetermined image into a target image with a resolution of the second image. Since the target image can be synthesized through low-resolution predetermined images and difference information, there is no need to obtain a high-resolution second image all the time. Noise caused by high-resolution images can be avoided, so that only low-resolution images can be used, and reduces the problem of low signal-to-noise ratio caused by high resolution, thereby reducing image noises, improving imaging effects and image quality. On the other hand, since there is no need to always acquire high-resolution images, and the low-resolution predetermined image can be converted into a high-resolution target image based on the difference information between the target pixel in the second image and the reference pixel in the first image, which reduces the problem of high power consumption caused by continuously outputting high-resolution images in related technologies, reduces the power consumption of the terminal device, and improves the performance and reliability of the terminal device, and also increases applicability.

Figure 2:
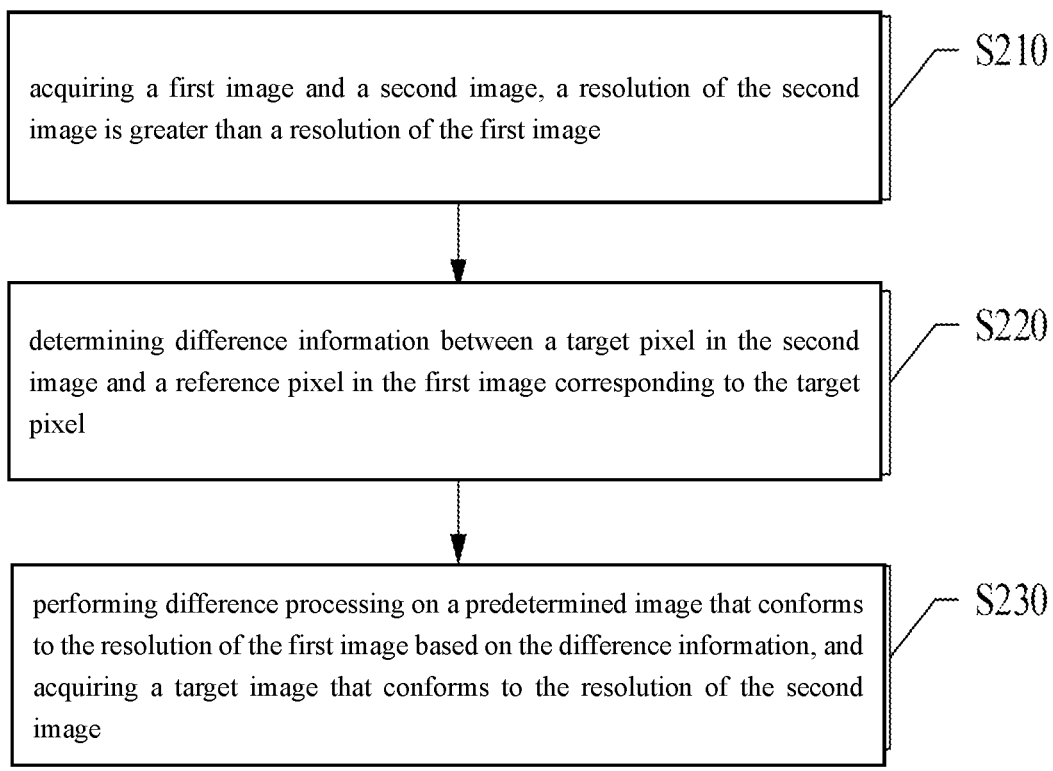
FIG. 2 shows a schematic diagram of an image processing method in an embodiment of the present disclosure.

On the basis of the foregoing system architecture, an image processing method is provided in some embodiments of the present disclosure, which can be applied to any application scenario that uses a camera to collect images and fuse images. Referring to FIG. 2, the image processing method may comprise step S210 to step S230, which are described in detail as follows:

In step S210: acquiring a first image and a second image are, and a resolution of the second image is greater than a resolution of the first image.

In embodiments of the present disclosure, multiple cameras may be used to photograph scenes and objects to be photographed in the scenes. The number of the multiple cameras can be two, three, four, etc., which is not limited here. Multiple cameras may be provided in a terminal device. The terminal device may be, for example, an electronic device that can take pictures such as a smart phone, as long as it has multiple cameras. The multiple cameras may include cameras with different pixels, and may specifically include a first camera and a second camera, etc., wherein the first camera may be a low-pixel camera, and the second camera may be a high-pixel camera. For facilitating the distinction, an image captured by the first camera may be used as a first image, and an image captured by the second camera may be used as a second image. The specific pixels of the first camera and the second camera can be determined based on actual needs, as long as the pixels of the first camera are less than the pixels of the second camera, which is not limited here. For example, the first camera may be 16 million pixels, and the second camera may be 64 million pixels or 100 million pixels, etc., which is not limited here. The second camera has a low signal-to-noise ratio in a low-light scene. The signal-to-noise ratio is a ratio of signal to noise in the image signal processing system. The larger the ratio, the smaller the noise and the better the effects.

The first image and the second image may be obtained after shooting the same scene, for example, the first image and the second image are respectively shot at the same time or sequentially. The first image and the second image may also be obtained after shooting different scenes, but the different scenes may include part of the same or corresponding specific scenes, for example, different scenes include the sky, a certain person, and so on. Since the pixels of the camera are different, and the pixels are used to describe the resolution, the resolution of the first image and the second image obtained are different. Specifically, the resolution of the first image obtained by the first camera may be smaller than the resolution of the second image.

In embodiments of the present disclosure, both the first image and the second image may be images taken in any mode of a camera in the terminal device, for example, may be a portrait mode, a professional mode, etc., which are not limited here. A format of the first image and the second image may be RAW (RAW image format). RAW is an unprocessed and uncompressed format. RAW can be conceptualized as original image encoding data. The format of the first image and the second image can also be YUV format. Y in YUV represents brightness, which is gray value, while UV represents chromaticity, which is used to describe the color and saturation of the image, and is used to specify the color of the pixel. In embodiments of the present disclosure, the format of the first image and the second image is not limited.

It should be noted that the first image and the second image here are used to determine the difference between different cameras, so the first image and the second image can be part of the frame images taken by each camera, such as any frame of image. Specifically, the first image may be a frame of image data collected by the first camera, and the second image may be a frame of image data collected by the second camera. Before acquiring the first image and the second image, if the cameras are not turned on, the first camera and the second camera may be turned on first to acquire a frame of image as the first image and the second image.

In step S220, the difference information between a target pixel in the second image and a reference pixel in the first image corresponding to the target pixel is determined.

In embodiments of the present disclosure, the target pixel refers to a pixel in the second image. For example, every pixel in the second image may be used as the target pixel, so as to traverse the entire second image. When determining the target pixel, it can be selected randomly or selected in sequence, which is not limited here.

The reference pixel point in the first image corresponding to the target pixel point refers to the pixel point in the neighborhood corresponding to the target pixel point in the first image, and the corresponding neighborhood of the target pixel point is an area adjacent to the target pixel point, which may specifically be a plurality of pixels located outside the target pixel point and having an equal or unequal distance from the target pixel point in the area range. For example, the reference pixel can be pixels corresponding to 4 neighborhoods, D neighborhoods, and 8 neighborhoods, and the number of reference pixel can be 4 or 8 within the range of adjacent areas, etc., and the more the number of the reference pixel point, the more accurate the difference information obtained. In an embodiment of the present disclosure, a reference pixel with 4-neighborhood pixel is taken as an example for description.

The difference information refers to a pixel deviation value or a pixel deviation between a pixel value of the target pixel in the second image and a pixel value of every reference pixel in the first image. Since every pixel can be used as a target pixel, the difference information can represent the deviation of the pixel values of the entire first image and the second image.

Figure 3:
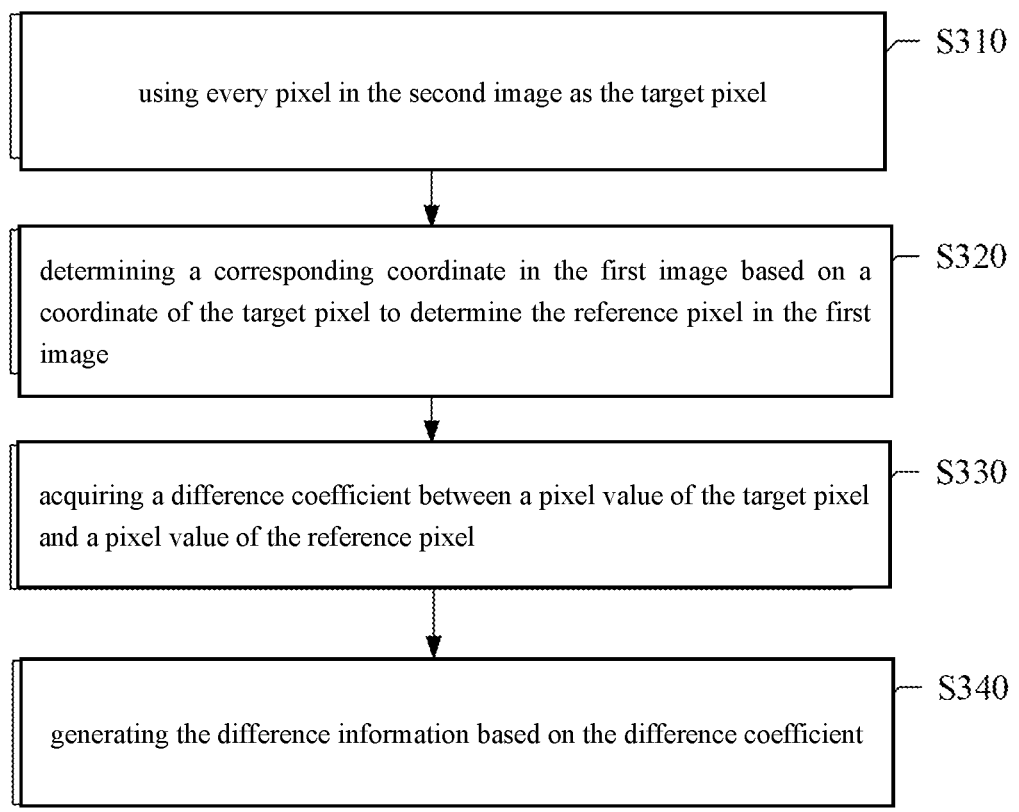
FIG. 3 shows a flowchart of determining difference information in an embodiment of the present disclosure.

FIG. 3 shows a flowchart for determining the difference information. Please referring to FIG. 3, it mainly includes step S310 to step S340, in which:

In step S310, every pixel in the second image is used as the target pixel. For example, based on an arrangement order of the pixel in the second image, every pixel can be used as the target pixel in turn. It is also possible to randomly select a pixel in the second image as the target pixel until all the pixels are processed, which is not limited here. For example, a certain pixel $f(x, y)$ in the second image can be used as the target pixel, wherein x, y represents position coordinates of the target pixel, and $f(x, y)$ represents a pixel value of the target pixel.

In step S320, the coordinates corresponding to the target pixel are determined in the first image based on the coordinates of the target pixel to determine the reference pixel in the first image.

In the embodiments of the present disclosure, the reference pixel in the first image may be determined based on the coordinates of the target pixel on the basis of determining the coordinates of the target pixel. Specifically, based on the coordinates of the target pixel, the adjacent coordinates of the coordinates can be determined as the coordinates corresponding to it in the first image, and then the position of the reference pixel can be determined. For example, the target pixel in the second image is $f(x, y)$, the adjacent 4 pixels can be pixels located at the top, bottom, left, and right of the target pixel, and the calculated coordinates of the positions of the adjacent 4 pixels in the image of the first pixels corresponds to the coordinates of the target pixel can be $g(x, y)$, $g(x, y+1)$, $g(x+1, y)$, and $g(x+1, y+1)$. It should be noted that the x and y in the two coordinates do not represent the same coordinates, but only represent the coordinate position in the two images. After the coordinates of the reference pixel are obtained, the pixel located at the coordinates can be used as the reference pixel in the first image based on these coordinates.

In step S330, a difference coefficient between a pixel value of the target pixel and a pixel value of the reference pixel is acquired.

In the embodiment of the present disclosure, after the target pixel is obtained, the pixel value of the target pixel can be obtained. At the same time, the pixel value of the reference pixel can also be obtained. The difference coefficient refers to the pixel difference between each target pixel and its corresponding reference pixel. Specifically, it may be the pixel difference between the pixel value of each target pixel and the pixel value of each reference pixel.

It can be calculated using a bilinear difference algorithm. The bilinear difference is a linear interpolation extension of the difference function of two variables, and its core idea is to perform a linear difference in two directions respectively. The bilinear difference algorithm makes full use of the four real pixel values around the virtual point in the source image to jointly determine a pixel value in the image, so the zoom effect is better.

Based on this, it is possible to calculate predetermined difference coefficients in multiple directions between the pixel value of the target pixel and the pixel value of the reference pixel based on multiple directions, so as to obtain the difference coefficient. Herein, the multiple directions may be a X direction and a Y direction, and each direction may correspond to a predetermined difference coefficient, and the predetermined difference coefficient in different directions may be the same or different, which is not specifically limited. For the X direction, the linear difference in the X direction is performed based on the combination of the X coordinate of the reference pixel, the X coordinate of the target pixel, and the respective corresponding pixel values. For the Y direction, the linear difference in the Y direction is performed based on the combination of the Y coordinate of the reference pixel, the Y coordinate of the target pixel, and the linear difference in the X direction. When performing the bilinear difference, the X-direction linear difference can be performed first, or the Y-direction linear difference can be performed first, which is not limited here. For example, a bilinear difference algorithm can be used to perform linear difference between the target pixel and its corresponding reference pixel in the X direction and the Y direction, respectively, to obtain a predetermined difference coefficient $\alpha$ in the X direction and a predetermined difference coefficient $\beta$ on the Y direction. Furthermore, the predetermined difference coefficient in multiple directions may be spliced to obtain the difference coefficient between the target pixel and the reference pixel, which may be expressed as $(\alpha, \beta)$, for example.

In step S340, the difference information is generated based on the difference coefficient.

In embodiments of the present disclosure, after the difference coefficient of a target pixel is obtained, every pixel in the second image can be used as the target pixel in the same way, and then every pixel in the second image can be compared with every pixel in the second image. A difference calculation is performed between corresponding reference pixels in the first image to obtain a difference coefficient for every pixel of the second image. Further, the difference coefficients of every pixel can be combined to generate a difference information. The number of the difference coefficient contained in the difference information can be the same as the number of pixels in the second image, and the difference information can be represented by a table of difference coefficient. On the basis of the coordinates of the target pixel, the difference information can be correspondingly recorded as w (x, y) based on the position of every pixel in the second image.

In step S230: performing difference processing on a predetermined image that conforms to the resolution of the first image based on the difference information, and acquiring a target image that conforms to the resolution of the second image.

In embodiments of the present disclosure, the predetermined image can be any graphic with the same resolution as the first image. For example, it can be other frame images in a certain video except the first image, and it can also be a continuously shot frame images other than the first image. The predetermined image may be captured by the first camera after the first image. The predetermined image may be captured by the first camera, so the resolution of the predetermined image may conform to the resolution of the first image, that is, a low resolution. The target image refers to the image obtained by adjusting the pixel value and the resolution of the predetermined image. The resolution of the target image is different from the predetermined image, and the resolution of the target image is the same as the resolution of the second image. Therefore, it can be considered that the resolution of the target image is the same as that of the image captured by the second camera.

The instructions of the step S230 may include: performing a logical operation on the pixel values of all pixels in the predetermined image based on the difference information, and adjusting the pixel values of all pixels to match the resolution of the second image to acquire the target image. In embodiments of the present disclosure, after the difference information between the first image and the second image is acquired, the difference information can be fused with the predetermined image obtained by the first camera, and the result of the fusion between the pixel values and the conversion result converts the predetermined image that meets the resolution of the first image into an image that meets the resolution of the second image, thereby using the converted image as the target image. Since the resolution of the target image is the same as the resolution of the second image captured by the second camera, the target image can be used to replace the image captured by the second camera.

For example, after the difference coefficient table is obtained, it can be calculated based on the difference coefficient table between the first image and the second image to combine with the pixel values of the pixels of the predetermined image whose resolution matches the first image to calculate and obtained a pixel value having the resolution that is consistent with the pixel value of the pixel in the high-definition target image of the second image, and the calculation formula may be as shown in the following formula (1):

$$f(x,y)=w(x,y)\star\{g(x,y),g(x,y+1),g(x+1,y),g(x+1,y+1)\} \quad (1)$$

Herein, the symbol ★ only means that the difference is performed by the bilinear difference method.

In the process of performing difference processing on pixels, specifically, the pixel values of the pixels are converted. For a low-resolution predetermined image, the pixel value of multiple neighborhood pixels in each frame of the predetermined image can be converted into a high-resolution pixel value through the difference coefficient table. By repeating this until the pixel values of all pixels in all frames in the predetermined image are converted and fused, so as to obtain the pixel value of the high-resolution pixel point based on the corresponding pixel values of all pixels in all frames in the low-resolution predetermined image collected by the first camera, thereby generating the target image.

In technical solutions provided by the embodiments of the present disclosure, since the target image can basically be obtained by background collection and synthesis, the first camera is used for continuous shooting during the shooting process, so power consumption during shooting of the second camera can be greatly reduced. Through the fusion of the predetermined image collected by the first camera and the difference information, the target image with the same resolution as the second image can be output, which improves the image quality. At the same time, in a low light environment, because the first camera is used for shooting, the high signal-to-noise ratio will greatly improve the image effect and the image quality on the basis of acquiring the same image effect as the second camera.

After the first image and the second image are acquired, the second camera can be turned off, only the low-pixel first camera is used for shooting, and the calculated difference information between the first image and the second image is used to perform image fusion to output an image with the same resolution as that taken by the second camera. Since the second camera is only used to collect a small number of images in order to calculate the difference information and update the difference information, after collecting a frame of the second image, the second camera can be turned off to reduce the use time of the high-pixel camera. The power consumption of the terminal device is reduced, the risk of heat generation of the terminal device is also avoided, and the reliability is improved, and it can improve the quality and image quality of the captured images, obtain high-quality effects through low power consumption, and improve the user experience.

In order to ensure the accuracy of the result, a second auxiliary image may be acquired after a predetermined period, and the difference coefficient may be updated based on the acquired second auxiliary image, so as to obtain the difference information based on the updated difference coefficient. The predetermined period can be, for example, any suitable time interval, such as 30 seconds or 2 minutes, and so on. The second auxiliary image here may be an image of another frame re-acquired by the second camera. The second auxiliary image may be different from the second image, but the resolution of the second auxiliary image and the resolution of the second image are the same. For example, the second auxiliary image may be one frame of image or multiple frames of image, and whether to collect one frame of image or multiple frames of image may be specifically determined based on the reference information. The reference information here may be a memory status of the terminal device and/or a CPU operating condition If the reference information meets the update condition, multiple frames of second auxiliary images are acquired. If it is not satisfied, only one frame of the second auxiliary image is acquired. Specifically, the memory situation can be described by the remaining memory space, and a first threshold can be provided to evaluate the memory situation. The CPU operating condition can be represented by the CPU operating speed, and a second threshold can be provided to evaluate the CPU operating condition. On this basis, the reference information can be determined when the memory condition is greater than the first threshold, or only when the CPU operating condition is greater than the second threshold, or when the memory condition is greater than the first threshold and the CPU operating condition is greater than the second threshold, etc., which meets the update condition to collect multiple frames of second auxiliary images. Otherwise, only one frame of the second auxiliary image is acquired. By collecting the second auxiliary image after a predetermined period and then performing real-time correction of the difference information can make the determined difference information more accurate.

After at least one frame of the second auxiliary image is acquired, the target pixel can be re-determined based on the at least one frame of the second auxiliary image, and the difference coefficient can be updated based on the re-determined target pixel and the reference pixel corresponding to the re-determined target pixel. Among them, for each frame of the second auxiliary image, a target pixel can be re-determined. After the second auxiliary image is determined, an image corresponding to the scene can be selected from the images acquired by the first camera as the first auxiliary image. Then the pixel value of the target pixel is determined based on the method in step S210 to step S220, and the predetermined difference between the pixel value of the reference pixel in the first auxiliary image corresponding to the target pixel in the x direction and the y direction. There may still be multiple reference pixels in the second auxiliary image, for example, 4 or 8, and so on. Further, it is possible to traverse all pixels in the second auxiliary image to obtain difference information corresponding to the second auxiliary image, and use the difference information to synthesize the target image.

Figure 4:
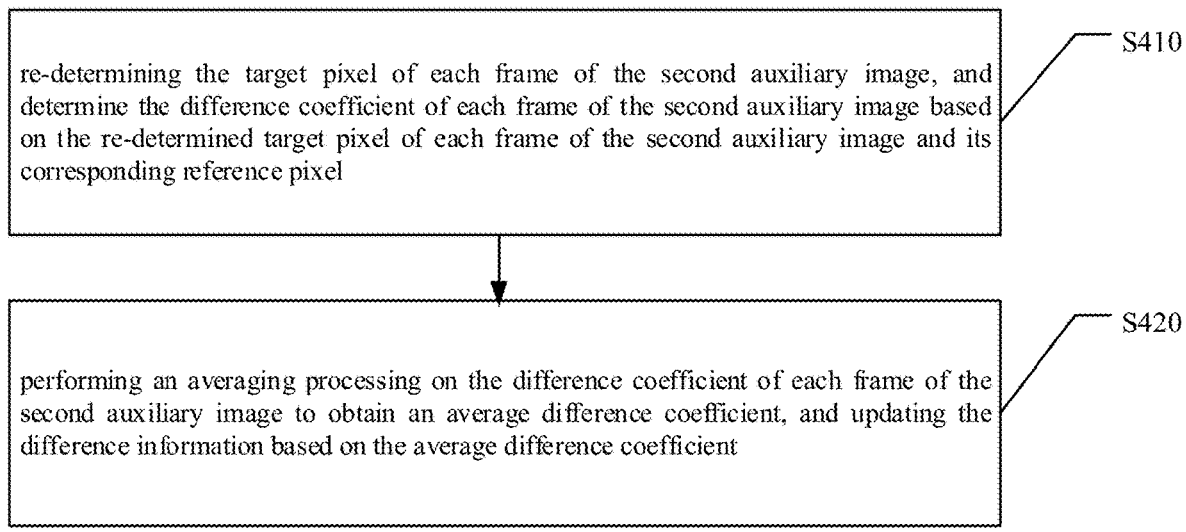
FIG. 4 shows a flowchart of updating difference information in an embodiment of the present disclosure.

FIG. 4 shows a flowchart for updating the difference information, which specifically includes step S410 and step S420, wherein:

In step S410, the target pixel of each frame of the second auxiliary image is re-determined, and the difference coefficient of each frame of the second auxiliary image is determined based on the re-determined target pixel of each frame of each second auxiliary image and its corresponding reference.

In embodiments of the present disclosure, firstly, it can be determined whether the second auxiliary image is one frame, which can be specifically determined based on the reference information. If the second auxiliary image is one frame, the original difference coefficient is directly updated based on the difference coefficient composed of all pixels in the second auxiliary image in multiple directions. If the second auxiliary image is multiple frames, the target pixel of each second auxiliary image can be re-determined in multiple directions, and the target pixel of each second auxiliary image and the corresponding reference pixel are determined to conform to the difference coefficient of each frame of the second auxiliary image. Herein, the number of difference coefficient may be determined based on the number of frames of the second auxiliary image and the number of pixels in each frame. The difference coefficient conforming to the second auxiliary image of each frame may be the pixel deviation between the pixel value of each target pixel in each frame of the second auxiliary image and the pixel value of the corresponding reference pixel.

In step S420, an averaging processing is performed on the difference coefficient of each frame of the second auxiliary image to obtain an average difference coefficient, and the difference information is updated based on the average difference coefficient.

In embodiments of the present disclosure, after the difference coefficient of each frame of the second auxiliary image is obtained, in order to improve the accuracy, all the difference coefficients may be averaged to obtain the average difference coefficient. Further, the average difference coefficient may be used as the difference coefficient of each pixel in the second auxiliary image of multiple frames, so as to update the original second image based on the difference coefficient of each pixel in the second auxiliary image of the multiple frames. The difference coefficient corresponding to the target pixel point realizes the dynamic update of the difference coefficient. Furthermore, the entire difference information is updated based on the combination of the difference coefficient of each pixel. It should be noted that after the updated difference coefficient is obtained, the original difference information can be updated based on the updated difference coefficient to obtain the difference information w (x, y) composed of the difference coefficients of all pixels corresponding to the second auxiliary image of multiple frames. That is, the difference coefficient of one pixel of the second auxiliary image of each frame is first calculated, averaged and combined, so as to update the difference information. In addition, it is also possible to perform an averaging processing after calculating the difference coefficients of all pixels of the second auxiliary image of each frame, so as to update the difference information. By selecting multiple frames of second auxiliary images and selecting multiple neighborhood pixels to correct and update the difference coefficient, more accurate difference information can be obtained, and the quality of the output target image can be made higher based on the accurate difference information, thereby improving the image effects.

Figure 5:
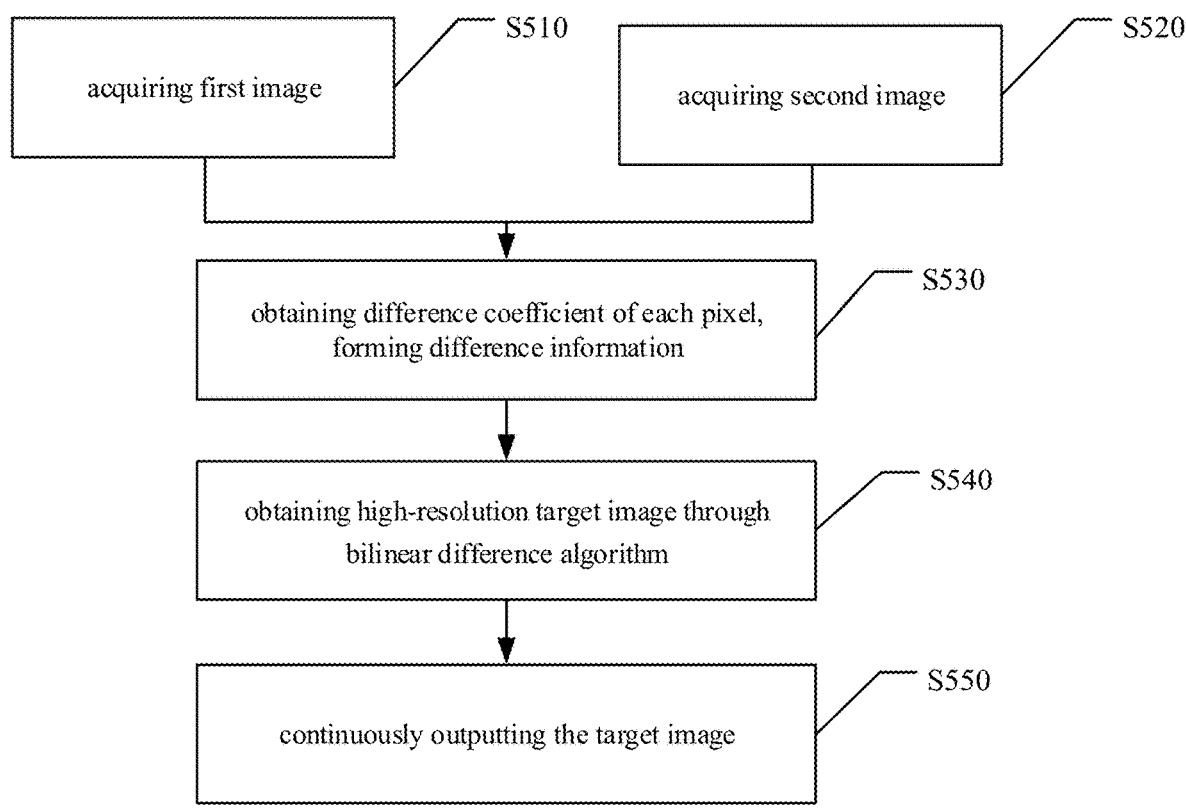
FIG. 5 shows a flowchart of outputting a target image in an embodiment of the present disclosure.

FIG. 5 shows an entire flowchart of image processing. Referring to FIG. 5, it mainly includes the following steps:

In step S510, a frame of a first image is acquired, and the pixel value of a certain pixel in the first image is g(x, y).

In step S520, a frame of a second image is acquired, and the pixel value of a certain pixel in the second image is f(x, y).

In step S530, the difference coefficient of each pixel is obtained to form difference information, that is, the difference coefficient table w(x, y).

In step S540, a high-resolution target image is obtained through a bilinear difference algorithm.

In step S550, the target image is continuously output.

In the technical solutions in FIG. 5, output of an effect of the video image of high-resolution by shooting with only a low-pixel camera can be achieved by calculating the difference coefficient of each pixel of the low-resolution and high-resolution images, and then performing the difference of the difference coefficient in the later stage. Since the low-pixel camera is used for shooting, the signal-to-noise ratio can be improved, so the image effect can be greatly improved. Since a low-resolution predetermined image is captured by a low-pixel camera, the predetermined image and difference information are then fused to obtain a high-resolution target image, and the synthesized target image is used as an image collected by the high-pixel camera. In the process of continuously outputting images and videos, the fusion operation can avoid the continuous shooting of high-pixel cameras, which can reduce the use time of high-pixel cameras, thereby reducing power consumption, and avoiding the signal-to-noise comparison caused by high-pixel cameras and reducing the noise of the image and improves the image quality.

Figure 6:
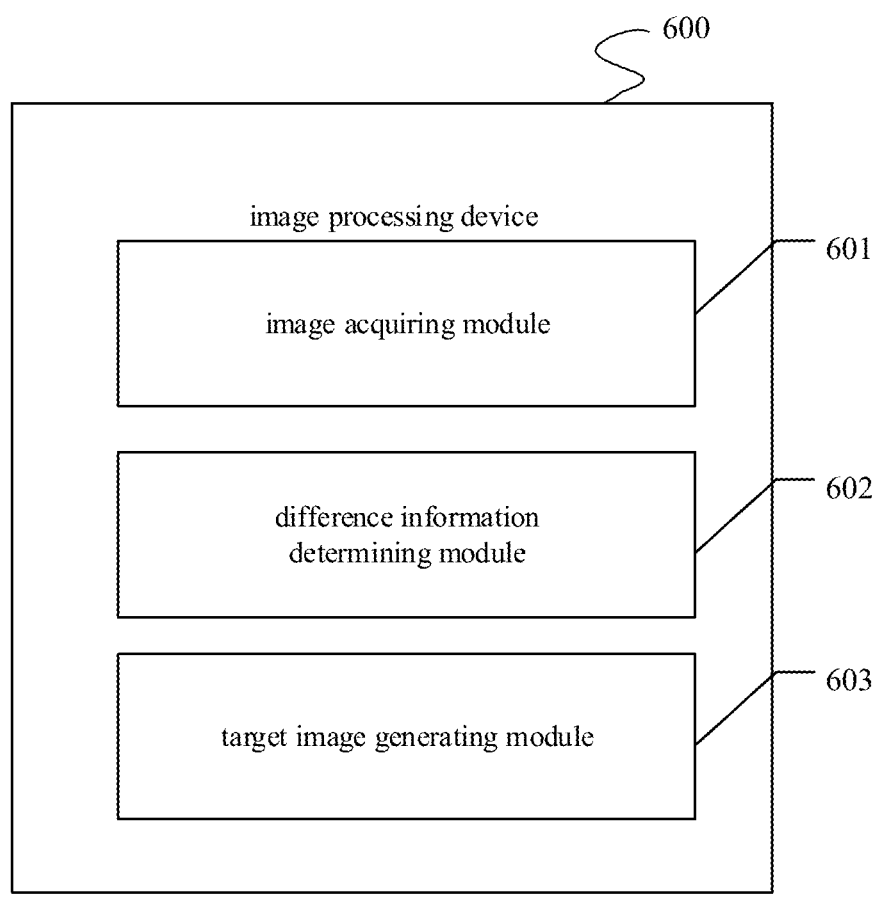
FIG. 6 shows a block diagram of an image processing device in an embodiment of the present disclosure.

In an embodiment of the present disclosure, an image processing device is provided. With reference to FIG. 6, an image acquiring module 601, configured to acquire a first image and a second image, wherein a resolution of the second image is greater than a resolution of the first image; a difference information determining module 602, configured to determine difference information between a target pixel in the second image and a reference pixel in the first image corresponding to the target pixel; and a target image generating module 603, configured to perform a difference processing on a predetermined image conforming to the resolution of the first image based on the difference information to obtain a target image conforming to the resolution of the second image.

In an embodiment of the present disclosure, the difference information determining module comprises: a target pixel designating module, configured to use each pixel in the second image as the target pixel; a reference pixel determining module, configured to determine a corresponding coordinate in the first image based on the coordinate of the target pixel to determine the reference pixel in the first image; a difference coefficient determining module, configured to obtain the difference coefficient between a pixel value of the target pixel and a pixel value of the reference pixel; and a difference coefficient combining module, configured to generate the difference information based on the difference coefficient.

In an embodiment of the present disclosure, the difference coefficient determining module is configured for calculating predetermined difference coefficients in multiple directions between the pixel value of the target pixel and the pixel value of the reference pixel to obtain the difference coefficient.

In an embodiment of the present disclosure, the target image designating module is configured for performing a logical operation on the pixel value of all pixels in the predetermined image based on the difference information, and adjusting the pixel value of all pixels to the pixel value that meets the resolution of the second image to obtain the target image.

In an embodiment of the present disclosure, the device further comprises: a difference information updating module, configured to acquire a second auxiliary image after a predetermined period, and update the difference coefficient based on the second auxiliary image to determine the difference information based on the updated difference coefficient.

In an embodiment of the present disclosure, the difference information updating module comprises: an auxiliary image acquiring module, configured to acquire at least one frame of the second auxiliary image based on the reference information; and a difference coefficient updating module, configured to re-determine the target pixel based on the at least one frame of the second auxiliary image, updating the difference coefficient based on the re-determined second auxiliary image and the corresponding reference pixel, and determining the difference information based on the updated difference coefficient.

In an embodiment of the present disclosure, if the second auxiliary image includes multiple frames comprises, the difference information updating module is configured to re-determine the target pixel of each frame of the second auxiliary image, and determine the difference coefficient of each frame of the second auxiliary image based on the re-determined target pixel of each frame of the second auxiliary image and its corresponding reference pixel; and perform an averaging processing on the difference coefficient of each frame of the second auxiliary image to obtain an average difference coefficient, and update the difference information based on the average difference coefficient.

The specific details of each module in the above-mentioned image processing device have been described in detail in the corresponding image processing method, and therefore will not be repeated here.

Although several modules or units of the device for action execution are mentioned in the above detailed description, this division is not mandatory. In fact, based on the embodiments of the present disclosure, the features and functions of two or more modules or units described above may be embodied in one module or unit. Conversely, the features and functions of a module or unit described above can be further divided into multiple modules or units to be embodied.

Although the various steps of the method in the present disclosure are described in a specific order in the drawings, this does not require or imply that these steps must be performed in the specific order, or that all the steps shown must be performed to achieve the desired result. Additionally or alternatively, some steps may be omitted, multiple steps may be combined into one step for execution, and/or one step may be decomposed into multiple steps for execution, etc.

In the embodiment of the present disclosure, an electronic device capable of implementing the above method is also provided.

Those skilled in the art can understand that various aspects of the present disclosure can be implemented as a system, a method, or a program product. Therefore, various aspects of the present disclosure can be specifically implemented in the following forms, namely: complete hardware implementation, complete software implementation (including firmware, microcode, etc.), or a combination of hardware and software implementations, which may be collectively referred to herein as "Circuit", "Module" or "System".

The electronic device 700 based on this embodiment of the present disclosure will be described below with reference to FIG. 7. The electronic device 700 shown in FIG. 7 is only an example, and should not bring any limitation to the function and scope of use of the embodiments of the present disclosure.

Figure 7:
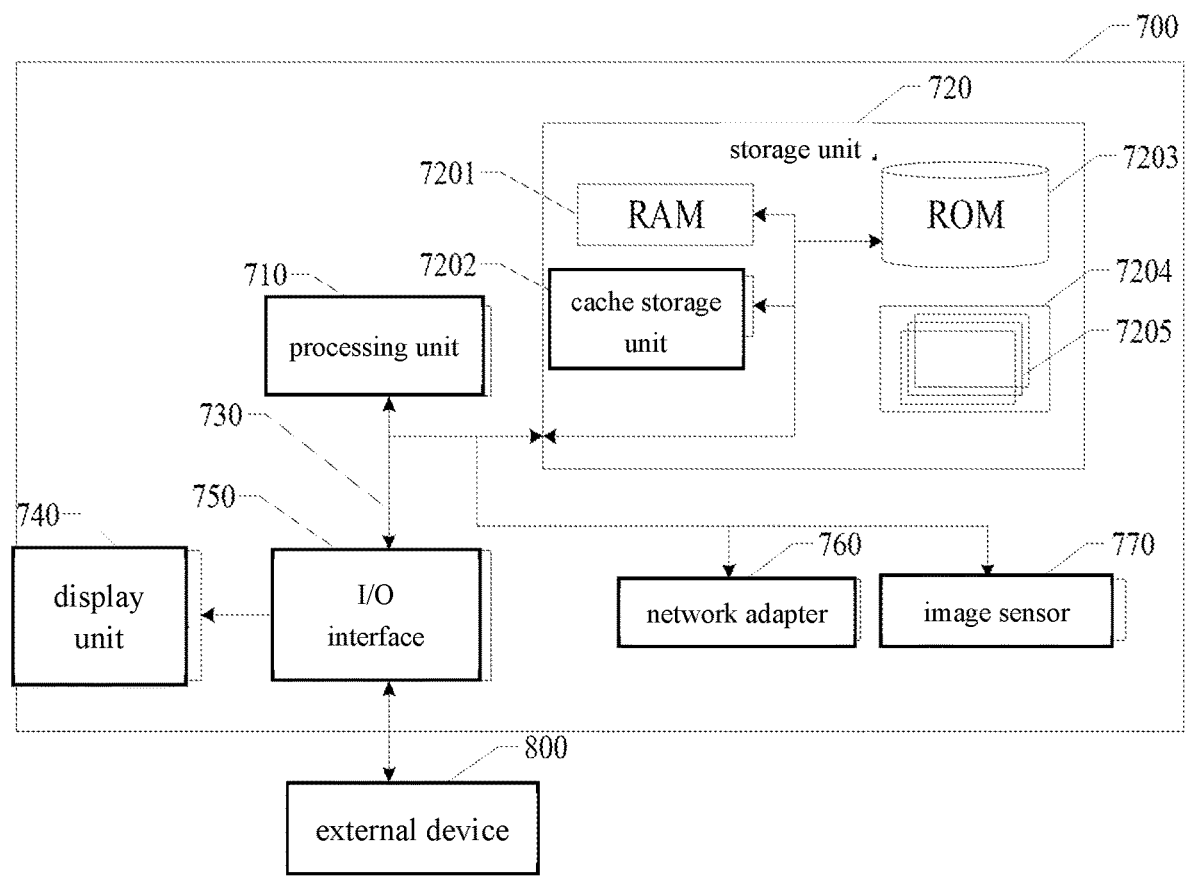
FIG. 7 shows a block diagram of an electronic device in an embodiment of the present disclosure.

As shown in FIG. 7, the electronic device 700 is represented in the form of a general-purpose computing device. The components of the electronic device 700 may include, but are not limited to: the aforementioned at least one processing unit 710, the aforementioned at least one storage unit 720, a bus 730 connecting different system components (including the storage unit 720 and the processing unit 710), a display unit 740, and an image sensor 770 The image sensor 770 is used to obtain images of corresponding resolutions.

Herein, the storage unit stores program codes, and the program codes can be executed by the processing unit 710, so that the processing unit 710 executes the various exemplary methods described in steps of implementing the "exemplary methods" of the present disclosure. For example, the processing unit 710 may perform the steps shown in FIG. 2: in step S210: acquiring a first image and a second image are, and a resolution of the second image is greater than a resolution of the first image; in step S220, the difference information between a target pixel in the second image and a reference pixel in the first image corresponding to the target pixel is determined; and in step S230, performing difference processing on a predetermined image that conforms to the resolution of the first image based on the difference information, and acquiring a target image that conforms to the resolution of the second image.

The storage unit 720 may include a readable medium in the form of a volatile storage unit, such as a random-access storage unit (RAM) 7201 and/or a cache storage unit 7202, and may further include a read-only storage unit (ROM) 7203.

The storage unit 720 may also include a program/utility tool 7204 having a set of (at least one) program module 7205. Such program module 7205 includes but is not limited to: an operating system, one or more application programs, other program modules, and program data, each of these examples or some combination may include the implementation of a network environment.

The bus 730 may represent one or more of several types of bus structures, including a storage unit bus or a storage unit controller, a peripheral bus, a graphics acceleration interface, a processing unit, or a local area using any bus structure among multiple bus structures.

The electronic device 700 may also communicate with one or more external devices 800 (such as keyboards, pointing devices, Bluetooth devices, etc.), and may also communicate with one or more devices that enable a user to interact with the electronic device 700, and/or communicate with any device (e.g., router, modem, etc.) that enables the electronic device 700 to communicate with one or more other computing devices. This communication can be performed through an input/output (I/O) interface 750. In addition, the electronic device 700 may also communicate with one or more networks (for example, a local area network (LAN), a wide area network (WAN), and/or a public network, such as the Internet) through the network adapter 760. As shown in the figure, the network adapter 760 communicates with other modules of the electronic device 700 through the bus 730. It should be understood that although not shown in the figure, other hardware and/or software modules can be used in conjunction with the electronic device 700, including but not limited to: microcode, device drivers, redundant processing units, external disk drive arrays, RAID systems, tape drives and data backup storage system, etc.

In the embodiments of the present disclosure, a non-transitory computer-readable storage medium is also provided, on which is stored a program product capable of implementing the above-mentioned method in this specification. In some possible implementation manners, various aspects of the present disclosure may also be implemented in the form of a program product, which includes program code. When the program product runs on a terminal device, the program code is used to enable the reducing terminal device executes the steps based on various exemplary embodiments of the present disclosure described in the above-mentioned "Exemplary Method" section of this specification.

The program product for implementing the above method based on the embodiment of the present disclosure may adopt a portable compact disk read-only memory (CD-ROM) and include program code, and may run on a terminal device, such as a personal computer. However, the program product of the present disclosure is not limited thereto. In this document, the readable storage medium can be any tangible medium that contains or stores a program, and the program can be used by or in combination with an instruction execution system, device, or device.

The program product can use any combination of one or more readable media. The readable medium may be a readable signal medium or a readable storage medium. The readable storage medium may be, for example, but not limited to, an electrical, magnetic, optical, electromagnetic, infrared, or semiconductor system, device, or device, or a combination of any of the above. More specific examples (non-exhaustive list) of readable storage media include: electrical connections with one or more wires, portable disks, hard disks, random access memory (RAM), read-only memory (ROM), erasable Type programmable read only memory (EPROM or flash memory), optical fiber, portable compact disk read only memory (CD-ROM), optical storage device, magnetic storage device, or any suitable combination of the above.

The computer-readable signal medium may include a data signal propagated in baseband or as a part of a carrier wave, and readable program code is carried therein. This propagated data signal can take many forms, including but not limited to electromagnetic signals, optical signals, or any suitable combination of the foregoing. The readable signal medium may also be any readable medium other than a readable storage medium, and the readable medium may send, propagate, or transmit a program for use by or in combination with the instruction execution system, apparatus, or device.

The program code contained on the readable medium can be transmitted by any suitable medium, including but not limited to wireless, wired, optical cable, RF, etc., or any suitable combination of the foregoing.

The program code used to perform the operations of the present disclosure can be written in any combination of one or more programming languages. The programming languages include object-oriented programming languages—such as Java, C++, etc., as well as conventional procedural styles. Programming language-such as "C" language or similar programming language. The program code can be executed entirely on the user's computing device, partly on the user's device, executed as an independent software package, partly on the user's computing device and partly executed on the remote computing device, or entirely on the remote computing device or server Executed on. In the case of a remote computing device, the remote computing device can be connected to a user computing device through any kind of network, including a local area network (LAN) or a wide area network (WAN), or it can be connected to an external computing device (for example, using Internet service providers). Business to connect via the Internet).

In addition, the above-mentioned drawings are merely schematic illustrations of the processing included in the method based on the embodiments of the present disclosure, and are not intended for limitation. It is easy to understand that the processing shown in the above drawings does not indicate or limit the time sequence of these processing. In addition, it is easy to understand that these processes can be executed synchronously or asynchronously in multiple modules, for example.

Those skilled in the art will easily think of other embodiments of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are only regarded as exemplary, and the true scope and spirit of the present disclosure are pointed out by the claims.

What is claimed is:

1. An image processing method, comprising:
   acquiring a first image and a second image, wherein a resolution of the second image is greater than a resolution of the first image;
   determining difference information between a target pixel in the second image and a reference pixel in the first image corresponding to the target pixel; and
   acquiring a target image with the same resolution as the second image by applying an image differencing process to a predetermined image with the same resolution as the first image based on the difference information.

2. The image processing method of claim 1, wherein determining difference information between the target pixel in the second image and the reference pixel in the first image corresponding to the target pixel comprises:
   using every pixel in the second image as the target pixel;
   determining a corresponding coordinate in the first image based on a coordinate of the target pixel to determine the reference pixel in the first image;
   acquiring a difference coefficient between a pixel value of the target pixel and a pixel value of the reference pixel; and
   generating the difference information based on the difference coefficient.

3. The image processing method of claim 2, wherein acquiring the difference coefficient between the pixel value of the target pixel and the pixel value of the reference pixel comprises:
   calculating predetermined difference coefficients in multiple directions between the pixel value of the target pixel and the pixel value of the reference pixel to obtain the difference coefficient.

4. The image processing method of claim 3, wherein calculating the predetermined difference coefficients in the multiple directions between the pixel value of the target pixel and the pixel value of the reference pixel to obtain the difference coefficient comprises:
   splicing the predetermined difference coefficients in the multiple directions to obtain the difference coefficient between the target pixel and the reference pixel.

5. The image processing method of claim 2, wherein generating the difference information based on the difference coefficient comprises:
   combining the difference coefficient of every pixel to generate the difference information.

6. The image processing method of claim 1, wherein performing difference processing on the predetermined image that conforms to the resolution of the first image based on the difference information, and acquiring a target image that conforms to the resolution of the second image comprises:
   performing a logical operation on the pixel value of all pixels in the predetermined image based on the difference information, and adjusting the pixel value of all pixels to the pixel value with the same resolution as the second image to obtain the target image.

7. The image processing method of claim 6, wherein performing the logical operation on the pixel value of all pixels in the predetermined image based on the difference information, and adjusting the pixel value of all pixels to the pixel value that with the same resolution as the second image to obtain the target image comprises:
   fusing the difference information with the predetermined image, and converting the predetermined image with the same resolution as the first image into an image with the same resolution as the second image through results of fusing and conversion to obtain the target image.

8. The image processing method of claim 2, wherein the method further comprises:
   acquiring a second auxiliary image after a predetermined period, and updating the difference coefficient based on the second auxiliary image to determine the difference information based on the updated difference coefficient.

9. The image processing method of claim 8, wherein acquiring the second auxiliary image after the predetermined period, and updating the difference coefficient based on the second auxiliary image to determine the difference information based on the updated difference coefficient comprises:
   acquiring at least one frame of the second auxiliary image based on the reference information;
   re-determining the target pixel is based on the at least one frame of the second auxiliary image, updating the difference coefficient based on the re-determined second auxiliary image and the corresponding reference pixel, and determining the difference information based on the updated difference coefficient.

10. The image processing method of claim 9, wherein acquiring the at least one frame of the second auxiliary image based on the reference information comprises:
    collecting multiple frames of the second auxiliary image if the reference information satisfies an update condition; or
    collecting one frame of the second auxiliary image if the reference information does not satisfy the update condition.

11. The image processing method of claim 9, wherein updating the difference coefficient based on the re-determined second auxiliary image and the corresponding reference pixel, and determining the difference information based on the updated difference coefficient if the second auxiliary image is one frame comprises:
    updating the original difference coefficient based on the difference coefficient composed of all pixels in the second auxiliary image in multiple directions, and determining the difference information based on the updated difference coefficient.

12. The image processing method of claim 9, wherein updating the difference coefficient based on the re-determined second auxiliary image and the corresponding reference pixel, and determining the difference information based on the updated difference coefficient if the second auxiliary image includes multiple frames comprises:
    re-determining the target pixel of each frame of the second auxiliary image, and determine the difference coefficient of each frame of the second auxiliary image based on the re-determined target pixel of each frame of the second auxiliary image and its corresponding reference pixel; and
    performing an averaging processing on the difference coefficient of each frame of the second auxiliary image to obtain an average difference coefficient, and updating the difference information based on the average difference coefficient.

13. An electronic device, comprising:
an image sensor;
a processor; and
a memory, configured to store executable instructions of the processor;
wherein the processor is configured to execute the executable instructions on an image acquired by the image sensor to:
acquire a first image and a second image, wherein a resolution of the second image is greater than a resolution of the first image;
determine difference information between a target pixel in the second image and a reference pixel in the first image corresponding to the target pixel; and
acquire a target image with the same resolution as the second image by applying an image differencing process to a predetermined image with the same resolution as the first image based on the difference information.

14. The electronic device of claim 13, wherein determine difference information between the target pixel in the second image and the reference pixel in the first image corresponding to the target pixel comprises:
use every pixel in the second image as the target pixel;
determine a corresponding coordinate in the first image based on a coordinate of the target pixel to determine the reference pixel in the first image;
acquire a difference coefficient between a pixel value of the target pixel and a pixel value of the reference pixel; and
generate the difference information based on the difference coefficient.

15. The electronic device of claim 14, wherein acquire the difference coefficient between the pixel value of the target pixel and the pixel value of the reference pixel comprises:
calculate predetermined difference coefficients in multiple directions between the pixel value of the target pixel and the pixel value of the reference pixel to obtain the difference coefficient.

16. The electronic device of claim 13, wherein acquire a target image with the same resolution as the second image by applying an image differencing process to a predetermined image with the same resolution as the first image based on the difference information comprises:
perform a logical operation on the pixel value of all pixels in the predetermined image based on the difference information, and adjusting the pixel value of all pixels to the pixel value with the same resolution as the second image to obtain the target image.

17. The electronic device of claim 16, wherein perform a logical operation on the pixel value of all pixels in the predetermined image based on the difference information, and adjusting the pixel value of all pixels to the pixel value with the same resolution as the second image to obtain the target image comprises:
fuse the difference information with the predetermined image, and converting the predetermined image with the same resolution as the first image into an image that with the same resolution as the second image through results of fusing and conversion to obtain the target image.

18. The electronic device of claim 14, the instructions further cause the one or more processors to:
acquire a second auxiliary image after a predetermined period, and updating the difference coefficient based on the second auxiliary image to determine the difference information based on the updated difference coefficient.

19. The electronic device of claim 18, wherein acquire the second auxiliary image after the predetermined period, and updating the difference coefficient based on the second auxiliary image to determine the difference information based on the updated difference coefficient comprises:
acquire at least one frame of the second auxiliary image based on the reference information;
re-determine the target pixel is based on the at least one frame of the second auxiliary image, updating the difference coefficient based on the re-determined second auxiliary image and the corresponding reference pixel, and determining the difference information based on the updated difference coefficient.

20. A non-transitory computer-readable storage medium having stored therein instructions that, when executed by a processor, cause the processor to:
acquire a first image and a second image, wherein a resolution of the second image is greater than a resolution of the first image;
determine difference information between a target pixel in the second image and a reference pixel in the first image corresponding to the target pixel; and
acquire a target image with the same resolution as the second image by applying an image differencing process to a predetermined image with the same resolution as the first image based on the difference information.

* * * * *